US010921828B2

(12) United States Patent
Ando et al.

(10) Patent No.: US 10,921,828 B2
(45) Date of Patent: Feb. 16, 2021

(54) FLUID CONTROL APPARATUS AND FLOW RATE RATIO CONTROL APPARATUS

(71) Applicants: HORIBA, Ltd., Kyoto (JP); HORIBA STEC, Co., Ltd., Kyoto (JP)

(72) Inventors: Yoshitake Ando, Kyoto (JP); Kotaro Takijiri, Kyoto (JP); Yuki Tanaka, Kyoto (JP); Yusuke Kanamaru, Kyoto (JP); Emiko Nakagawa, Kyoto (JP)

(73) Assignees: HORIBA, Ltd., Kyoto (JP); HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 16/436,453

(22) Filed: Jun. 10, 2019

(65) Prior Publication Data

US 2019/0384330 A1    Dec. 19, 2019

(30) Foreign Application Priority Data

Jun. 18, 2018    (JP) .................................. 2018-115604

(51) Int. Cl.
*G05D 7/06*  (2006.01)
*G05D 16/20*  (2006.01)

(52) U.S. Cl.
CPC ......... *G05D 7/0652* (2013.01); *G05D 7/0664* (2013.01); *G05D 16/204* (2013.01); *Y10T 137/87314* (2015.04); *Y10T 137/87772* (2015.04)

(58) Field of Classification Search
CPC .. G05D 7/0623; G05D 7/0635; G05D 7/0652; G05D 7/0664; G05D 16/204; Y10T 137/87314; Y10T 137/87772

USPC ............................................. 137/599.07, 870
See application file for complete search history.

(56) References Cited

U.S. PATENT DOCUMENTS

| | | | | |
|---|---|---|---|---|
| 4,052,003 A | * | 10/1977 | Steffen ................ | A01M 7/0089 239/71 |
| 4,126,540 A | * | 11/1978 | Grosboll ................ | B01J 8/0278 208/146 |
| 4,392,611 A | * | 7/1983 | Bachman ............ | A01M 7/0089 222/613 |
| 5,158,714 A | * | 10/1992 | Shih ....................... | B01D 3/008 261/96 |

(Continued)

FOREIGN PATENT DOCUMENTS

WO    2008072614 A1    6/2008

*Primary Examiner* — William M McCalister
(74) *Attorney, Agent, or Firm* — Alleman Hall Creasman & Tuttle LLP (57) ABSTRACT

In order to prevent leakage, a fluid control apparatus is adapted to include: a valve provided in the flow path through which the fluid flows; a pressure sensor provided upstream of the valve; a flow rate sensor provided downstream of the pressure sensor; a reference pressure determination part that is inputted with a measured flow rate from the flow rate sensor and on the basis of a flow rate-pressure map, determines a reference pressure corresponding to the measured flow rate; a reference flow rate calculation part that calculates a reference flow rate so that the deviation between the reference pressure and a measured pressure measured by the pressure sensor decreases; and a valve control part that controls the opening of the valve so that the deviation between the reference flow rate and the measured flow rate decreases.

6 Claims, 5 Drawing Sheets

(56) References Cited

U.S. PATENT DOCUMENTS

| | | | | | |
|---|---|---|---|---|---|
| 5,329,965 | A * | 7/1994 | Gordon | | G05D 7/0652 |
| | | | | | 137/599.07 |
| 5,394,755 | A * | 3/1995 | Sudo | | G01F 1/34 |
| | | | | | 73/861 |
| 5,687,092 | A * | 11/1997 | Bretmersky | | G05D 7/0635 |
| | | | | | 702/100 |
| 5,942,163 | A * | 8/1999 | Robinson | | F24F 6/18 |
| | | | | | 261/118 |
| 6,302,106 | B1 * | 10/2001 | Lewis | | B63C 11/24 |
| | | | | | 128/204.22 |
| 8,015,995 | B2 * | 9/2011 | Brodeur | | G01F 1/363 |
| | | | | | 137/487.5 |
| 8,019,481 | B2 * | 9/2011 | Yamaguchi | | G05D 7/0664 |
| | | | | | 700/282 |
| 8,517,353 | B2 * | 8/2013 | Bannon | | F15D 1/001 |
| | | | | | 261/110 |
| 8,944,095 | B2 * | 2/2015 | Okabe | | C23C 16/00 |
| | | | | | 137/486 |
| 9,477,232 | B2 * | 10/2016 | Takahashi | | G05D 7/0664 |
| 9,904,296 | B2 * | 2/2018 | Peczalski | | G05D 7/0635 |
| 10,245,608 | B2 * | 4/2019 | Dufault | | B05B 12/088 |
| 2003/0130807 | A1 * | 7/2003 | Annbrosina | | G01F 1/68 |
| | | | | | 702/45 |
| 2005/0005994 | A1 * | 1/2005 | Sugiyama | | G05D 7/0664 |
| | | | | | 141/4 |
| 2006/0169327 | A1 * | 8/2006 | Shajii | | G05D 16/206 |
| | | | | | 137/487.5 |
| 2007/0186983 | A1 * | 8/2007 | Ding | | G05D 11/132 |
| | | | | | 137/487.5 |
| 2010/0030390 | A1 * | 2/2010 | Yamaguchi | | G05D 11/132 |
| | | | | | 700/285 |
| 2010/0163119 | A1 * | 7/2010 | Isobe | | G01F 1/6847 |
| | | | | | 137/486 |
| 2010/0229976 | A1 * | 9/2010 | Hirata | | G05D 7/0664 |
| | | | | | 137/561 A |
| 2011/0094596 | A1 * | 4/2011 | Sugiyama | | G05D 7/0658 |
| | | | | | 137/14 |
| 2011/0106319 | A1 * | 5/2011 | Takahashi | | G05D 7/0635 |
| | | | | | 700/282 |
| 2011/0162742 | A1 * | 7/2011 | Ulens | | F24D 19/1024 |
| | | | | | 137/624.27 |
| 2014/0061517 | A1 * | 3/2014 | Maier | | G05D 16/2026 |
| | | | | | 251/65 |
| 2014/0182692 | A1 * | 7/2014 | Hirata | | G05D 7/0617 |
| | | | | | 137/10 |
| 2016/0079105 | A1 * | 3/2016 | Parkhe | | H01L 21/6831 |
| | | | | | 137/14 |
| 2016/0274595 | A1 * | 9/2016 | Ohmi | | G01F 5/005 |
| 2018/0106247 | A1 * | 4/2018 | Yamashima | | F04B 49/08 |
| 2018/0253111 | A1 * | 9/2018 | Goto | | G01F 25/0007 |
| 2019/0264716 | A1 * | 8/2019 | Kumar | | F15D 1/001 |
| 2019/0278305 | A1 * | 9/2019 | Takijiri | | H01L 21/67017 |
| 2019/0354120 | A1 * | 11/2019 | Takijiri | | F16K 17/025 |

\* cited by examiner

FLUID CONTROL APPARATUS AND FLOW RATE RATIO CONTROL APPARATUS

TECHNICAL FIELD

The present invention relates to a fluid control apparatus in which pressure on the upstream side of a valve has to be kept at a predetermined limit pressure or less.

BACKGROUND ART

For example, in semiconductor manufacturing processes, gases are sometimes supplied respectively from multiple introduction ports to a deposition chamber or the like at a predetermined flow rate ratio. The introduction ports are respectively provided with flow paths, and each of the flow paths is provided with a packaged fluid control apparatus called a mass flow controller that controls the flow rate of a fluid flowing through the flow path (see Patent Literature 1).

Meanwhile, among gases used in semiconductor manufacturing processes, one toxic to human bodies and one whose chemical properties to human bodies are not well known exist, and such gases have to be prevented from leaking outside from pipes and the like constituting flow paths.

Accordingly, in order to prevent the pressure of the gas from being increased to result in leakage on the upstream side of the above-described mass flow controller, keeping the upstream side of the mass flow controller at, for example, a limit pressure lower than atmospheric pressure is required specification.

In response to such a required specification, the pressure on the upstream side is configured to be kept constant at a predetermined value lower than the limit pressure by providing a pressure regulator on the upstream side of the mass flow controller in the flow path.

However, in the case where the pressure on the upstream side of the mass flow controller is configured to be kept constant at the predetermined low pressure by the pressure regulator, the flow rate of the fluid to be supplied to the mass flow controller is in a limited state. For example, when an excessive reference flow rate is set in the mass flow controller in the state where the supply of the fluid is limited as described, the convergence time required for a flow rate output to converge at the reference flow rate becomes longer.

CITATION LIST

Patent Literatures

Patent Literature 1: International Publication No. WO2008/072614

SUMMARY OF INVENTION

Technical Problem

The present invention has been made in consideration of the problem as described above, and intends to provide a fluid control apparatus capable of suppressing pressure on the upstream side of a valve to, for example, a limit pressure or less so as to prevent leakage, as well as converging the flow rate of fluid flowing through a flow path to a reference flow rate within a predetermined convergence time.

Solution to Problem

That is, as a result of intensive examination, the fluid control apparatus according to the present invention has been first made by breaking free from the conventional subjective impression that the pressure of fluid supplied from an upstream side must be always fixed at a constant value lower than a limit pressure for safety, and recognizing that as long as the pressure is the limit pressure or less, even when the pressure varies, required safety specifications can be satisfied.

Specifically, the fluid control apparatus according to the present invention includes: a valve provided in a flow path through which fluid flows; a pressure sensor provided on an upstream side of the valve; a flow rate sensor provided on a downstream side of the pressure sensor; a reference pressure determination part that is inputted with a measured flow rate measured by the flow rate sensor and on the basis of a flow rate-pressure map, determines a reference pressure corresponding to the measured flow rate; a reference flow rate calculation part that calculates a reference flow rate so that the deviation between the reference pressure determined by the reference pressure determination part and a measured pressure measured by the pressure sensor decreases; and a valve control part that controls the opening of the valve so that a deviation between the reference flow rate calculated by the reference flow rate calculation part and the measured flow rate measured by the flow rate sensor decreases.

In such a configuration, on the basis of the flow rate-pressure map, for example, the reference pressure making it possible to most shorten the convergence time required for a flow rate output of the fluid passing through the valve to converge at the reference flow rate can be set within a range equal to or less than a limit pressure, corresponding to the measured flow rate. Also, the reference flow rate necessary to achieve the reference pressure, which is ideal, from the measured pressure at the moment is calculated by the reference flow rate calculation part, and therefore pressure on the upstream side of the valve can be suppressed to the limit pressure or less while performing flow rate control with the valve.

Accordingly, for example, while satisfying a required safety specification concerning pressure, the flow rate control can be sped up.

For example, in order to make it possible to adjust the characteristics of the reference flow rate calculated by the reference flow rate calculation part to more shorten the convergence time of the flow rate output while fixing the flow rate-pressure map, it is only necessary that the reference flow rate calculation part is configured to calculate the reference flow rate by a PID operation based on the deviation between the reference pressure and the measured pressure and set PID gains and the fluid control apparatus further includes a gain reception part that receives a gain setting command that sets the PID gains in the reference flow rate calculation part. Note that the PID gains are ones collectively referred to as a proportional gain, an integral gain, and a derivative gain, and the gain setting command is a command for changing or setting at least one of these parameters. In such a configuration, by adjusting the PID gains on the basis of the same idea as conventional flow rate feedback control, flow rate response characteristics can be adjusted in such a manner as to satisfy required specifications while varying the pressure on the upstream side of the valve within the range equal to or less than the limit pressure.

In order to, when desired flow rate control characteristics cannot be obtained only by adjusting the PID gains, more greatly change the control characteristics, and satisfy required specifications concerning the limit pressure and the convergence time, it is only necessary that the fluid control apparatus is one further including: a map storage part that stores the flow rate-pressure map; and a map reception part that receives a map update command that updates the flow rate-pressure map stored in the map storage part.

Specific examples of setting the flow rate-pressure map and the PID gains include one in which they are set so that a convergence time required for the deviation between the measured flow rate and the reference flow rate to converge within a tolerance becomes equal to or less than a predetermined time.

In order to suppress the pressure on the upstream side of the valve to the limit pressure or less even without strictly setting the flow rate-pressure map within the entire flow rate zone, it is only necessary that the fluid control apparatus is one further including a reference pressure limiter that, when the reference pressure determined by the reference pressure determination part is larger than a limit pressure, changes the reference pressure to the limit pressure. In such a configuration, for example, even when a flow rate-pressure map optimized giving priority for the convergence time of the flow rate output to satisfying the required specification without considering pressure limitation is created, the pressure on the upstream side of the valve can be prevented from exceeding the limit pressure. Accordingly, as compared with the case of creating a map in consideration of both the convergence time and the limit pressure, a workload on that can be significantly reduced.

In order to not only suppress the measured pressure to the limit pressure or less but converge the flow rate at high speed, it is only necessary that the reference pressure determination part is one that determines the reference pressure so that the convergence time required for the deviation between the reference flow rate and the measured flow rate to converge within the tolerance becomes equal to or less than a predetermined time.

In order to make it possible to, even when the flow rate varies, keep the convergence time of the flow rate at substantially the same level of time length regardless of the value of the flow rate, it is only necessary that the reference pressure determination part is one that sets a value of the reference pressure to be larger as a value of the measured flow rate increases.

In order to allow the valve to affect both the pressure on the upstream side of the valve and a flow rate obtained by the valve, and converge the obtained flow rate at high speed while suppressing the pressure on the upstream side of the valve to the limit pressure or less, it is only necessary that the measured pressure measured by the pressure sensor is one indicating a pressure of a gas reservoir formed in the flow path on the upstream side of the valve, the measured pressure is configured to change depending on a deviation between an inflow flow rate flowing into the gas reservoir from an upstream side and an outflow flow rate obtained by the valve, and the reference flow rate calculation part is configured to output the reference flow rate depending on a change in the measured flow rate, which is caused by the deviation between the inflow flow rate and the outflow flow rate, to the valve control part.

When the flow rate sensor is a thermal type flow rate sensor, the fluid control apparatus according to the present invention can regulate the pressure of the fluid to have a desired value at a value equal to or less than the limit pressure, and therefore for example, a situation where the sensitivity of the thermal type flow rate sensor is lost at near vacuum pressure can be prevented.

Preferred applicable examples of the present invention include a flow rate ratio control apparatus that controls a flow rate ratio of fluid flowing through multiple branch flow paths branching from an end of a supply flow path through which the fluid is supplied, and the flow rate ratio control apparatus includes: multiple fluid control apparatuses that are respectively provided in the respective branch flow paths and each of which is provided with a valve, a flow rate sensor, and a valve control part adapted to control the opening of the valve so that the deviation between an inputted reference flow rate and a measured flow rate by the flow rate sensor decreases; a pressure sensor provided in the supply flow path or on an upstream side of the valves of the respective fluid control apparatuses in the respective branch flow paths; a total flow rate acquisition part that respectively acquires the measured flow rates by the respective flow rate sensors provided in the respective branch flow paths, and acquires a total flow rate that is the sum of the respective measured flow rates; a reference pressure determination part that is inputted with the total flow rate, and on the basis of a flow rate-pressure map, determines a reference pressure corresponding to the total flow rate, a target total flow rate calculation part that calculates a target total flow rate so that a deviation between the reference pressure determined by the reference pressure determination part and a measured pressure measured by the pressure sensor decreases; and a flow rate distributor that, on the basis of the target total flow rate and a predetermined target flow rate ratio of the fluid flowed through the respective branch flow paths, determines reference flow rates to be inputted to the fluid control apparatuses provided in the respective branch flow paths.

In such a configuration, while suppressing pressure in the supply flow path to a limit pressure or less to keep it safely, the convergence time required for the flow rate of the fluid flowed through each of the branch flow paths to converge can also be controlled to a predetermined time or less.

In order to make it possible to adjust the control characteristics of the flow rate ratio control apparatus as a whole so that the flow rates of the fluid flowing through the branch flow path converge to the reference flow rates respectively within predetermined times, it is only necessary that the target total flow rate calculation part is configured to calculate the target total flow rate by a PID operation based on the deviation between the reference pressure and the measured pressure and set PID gains, and the flow rate ratio control apparatus further includes a gain reception part that receives a gain setting command that sets the PID gains in the target total flow rate calculation part.

In order to make it possible to, when desired flow rate characteristics cannot be adjusted only by adjusting the PID gains, greatly change control characteristics, and satisfy required specifications concerning the limit pressure and the convergence time, it is only necessary that the flow rate ratio control apparatus is one further including a map storage part that stores the flow rate-pressure map; and a map reception part that receives a map update command that updates the flow rate-pressure map stored in the map storage part. In such a configuration, the fluid can be supplied from the respective branch flow paths at a desired total flow rate and flow rate ratio at high speed in addition to ensuring safety.

Specific examples of setting the flow rate-pressure map and the PID gains include one in which they are set so that convergence times required for deviations between the measured flow rates and corresponding ones of the reference flow rates to converge within a tolerance become equal to or less than a predetermined time.

In order to make it possible to reduce a load on creating the flow rate-pressure map, it is only necessary that the flow rate ratio control apparatus is one further including a reference pressure limiter that, when the reference pressure determined by the reference pressure determination part is larger than a limit pressure, changes the reference pressure to the limit pressure.

Examples concerning a position where the pressure sensor is provided include one in which the pressure sensor is provided in at least one branch flow path or the respective fluid control apparatuses are respectively provided with the pressure sensors.

Advantageous Effects of Invention

As described above, the fluid control apparatus according to the present invention is capable of suppressing the pressure on the upstream side of the valve to the limit pressure or less, and also shortening the convergence time required for the flow rate output obtained by the valve to converge to the reference flow rate.

DESCRIPTION OF EMBODIMENTS

A fluid control apparatus 100 according to a first embodiment of the present invention will be described with reference to FIGS. 1 to 4.

The fluid control apparatus 100 of the first embodiment is, for example, one used to supply gas as fluid to a chamber or the like in a semiconductor manufacturing process. The gas used here is one of a type that must not be leaked outside from a pipe and the like forming a flow path for various reasons such as being toxic to human bodies and being ignitable.

Figure 1:
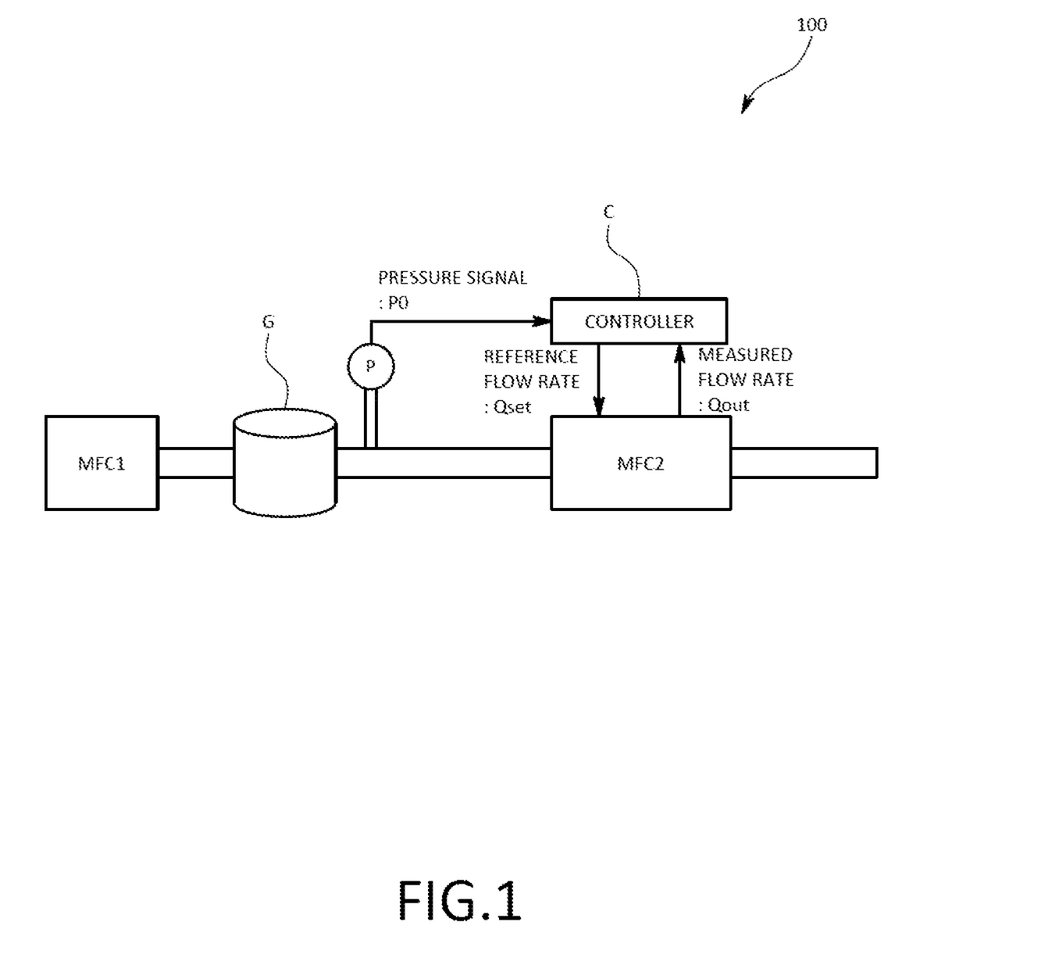
FIG. 1 is a schematic diagram illustrating the outline of a fluid control apparatus according to a first embodiment of the present invention.

As illustrated in FIG. 1, a hardware portion constituting the fluid control apparatus 100 of the first embodiment is provided between a first mass flow controller MFC1 serving as a gas supply source and a chamber present on the lowermost side in the flow path.

That is, the fluid control apparatus 100 is one that, in the flow path, includes: a second mass flow controller MFC2 provided on the downstream side of the first mass flow controller MFC1; a pressure sensor P provided between the first mass flow controller MFC1 and the second mass flow controller MFC2; and a controller C that inputs a reference flow rate to the second mass flow controller MFC2 on the basis of a measured pressure measured by the pressure sensor P. In other words, the first mass flow controller MFC1 does not constitute the fluid control apparatus 100 of the first embodiment.

The flow path portion between the first mass flow controller MFC1 and the second mass flow controller MFC2 has volume, and therefore a gas reservoir G having a predetermined volume is formed as illustrated typified by FIG. 1. The pressure sensor P is one that measures the pressure of the gas reservoir G.

Figure 2:
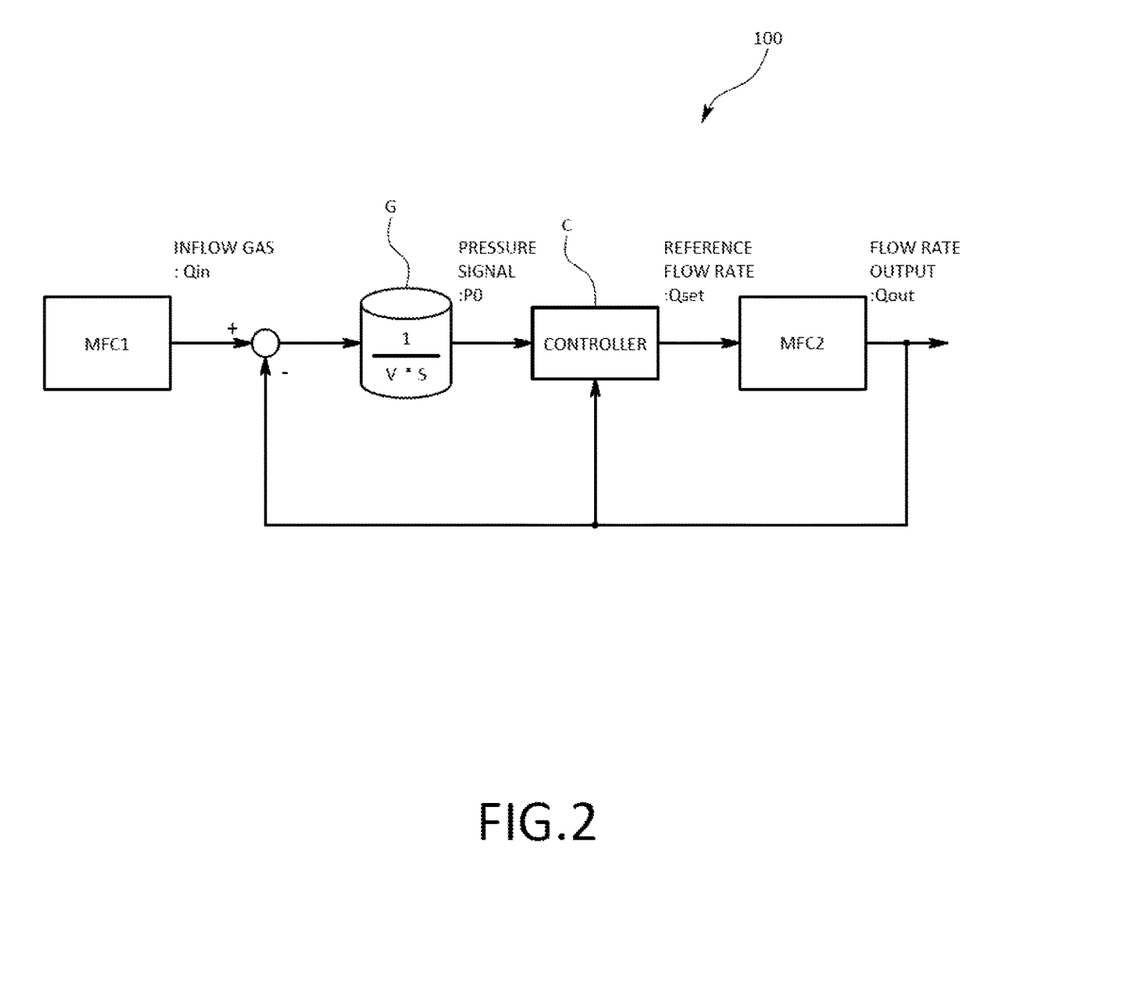
FIG. 2 is a schematic block diagram illustrating the outline of control by the fluid control apparatus of the first embodiment.

Considering the system illustrated in FIG. 1 as a control block diagram results in a diagram as illustrated in FIG. 2. Specifically, the pressure of the gas reservoir G is determined by the difference between the flow rate $Q_{in}$ of the gas flowing from the first mass flow controller MFC1 into the gas reservoir G and a flow rate output $Q_{out}$ obtained by the second mass flow controller MFC2. The pressure of the gas reservoir G is measured by the pressure sensor P, and inputted to the controller C as a pressure signal indicating the measured pressure P0. In addition, the controller C is also inputted with the flow rate output $Q_{out}$ measured by the second mass flow controller MFC2. The controller C first sets a reference pressure $P_{set}$ corresponding to the flow rate output $Q_{out}$, and further inputs a reference flow rate $Q_{set}$ corresponding to the value of the deviation between the reference pressure $P_{set}$ and the measured pressure P0 to the second mass flow controller MFC2. The second mass flow controller MFC2 outputs the flow rate output $Q_{out}$ corresponding to the inputted reference flow rate $Q_{set}$.

The controller C is one that appropriately changes the reference flow rate $Q_{set}$ to be set in the second mass flow controller MFC2, and controls the flow rate output $Q_{out}$ obtained by the second mass flow controller MFC2 so that the pressure of the gas reservoir G measured by the pressure sensor P is suppressed to a value lower than a limit pressure. At the same time, the reference flow rate $Q_{set}$ is controlled so that the convergence time required for the deviation between the reference flow rate $Q_{set}$ and the flow rate output $Q_{out}$ to converge to a tolerance becomes equal to or less than a predetermined time.

Figure 3:
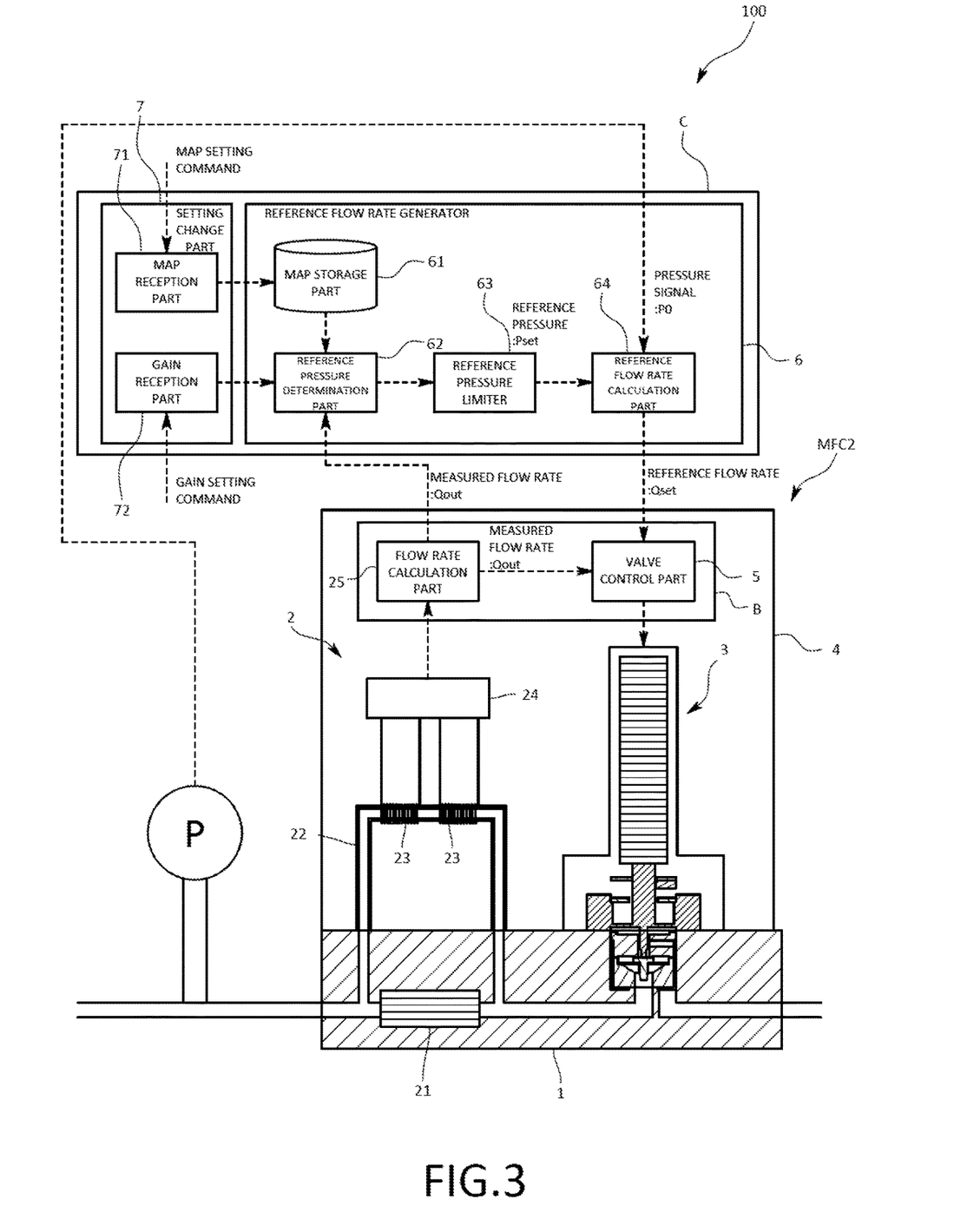
FIG. 3 is a schematic diagram illustrating the details of the fluid control apparatus of the first embodiment.

A more detailed configuration and operation of the fluid control apparatus 100 of the first embodiment will be described with reference to FIG. 3.

The second mass flow controller MFC2 is one including: a body 1 attached to the flow path and formed with an internal flow path; a flow rate sensor 2 and valve 3 attached to the body 1; a cover 4 attached to the body 1 so as to cover the flow rate sensor 2 and the valve 3; and a control board B provided inside the cover 4 to perform flow rate feedback control of the opening of the valve 3. That is, the mass flow controller is one in which the various components for performing flow rate control are packaged.

The flow rate sensor 2 is a thermal type flow rate sensor, and configured to include: a flow dividing element 21 provided in the flow path; a narrow tube 22 that branches from the upstream side of the flow dividing element 21 and merges with the downstream side of the flow dividing element 21; two electric heating coils 23 that are wound on the narrow tube 22 and respectively applied with voltages so as to be kept at constant temperatures; a detection circuit 24 that detects the difference between the voltages applied to the respective electric heating coils 23; and a flow rate calculation part 25 that, on the basis of the output of the detection circuit 24, calculates the flow rate of the gas flowing through the flow path.

The valve 3 is, for example, a piezo valve, and the opening thereof is controlled by applied voltage.

The control board B is a computer including a CPU, a memory, an A/D converter, a D/A converter, and various input/output means, and the functions thereof as a controller are implemented by executing a mass flow controller program stored in the memory to cooperate with various devices. That is, the control board B fulfills at least functions as the above-described flow rate calculation part 25 and a valve control part 5.

The valve control part 5 controls the opening of the valve 3 on the basis of the reference flow rate inputted from outside and the measured flow rate measured by the flow rate sensor 2. More specifically, the valve control part 5 changes the applied voltage to the valve 3 to change the opening of the valve 3 so that the deviation between the reference flow rate and the measured flow rate decreases. In the first embodiment, the reference flow rate is set to a value outputted from the controller C.

As described, the second mass flow controller MFC2 is formed with a flow rate feedback system and forms a minor loop in the fluid control apparatus 100.

Next, the details of the controller C will be described.

The controller C is one configured as a separate body from the second mass flow controller MFC2, and the functions thereof are implemented by a computer including a CPU, a memory, an A/D converter, a D/A converter, and various input/output means. The controller C fulfills at least function as a reference flow rate generator 6 and a setting change part 7, which changes a set value of the reference flow rate generator 6 on the basis of a command inputted from outside, by executing a program stored in the memory to make various devices cooperate.

The reference flow rate generator 6 is inputted with the measured flow rate measured by the second mass flow controller MFC2 and the measured pressure measured by the pressure sensor P. The reference flow rate generator 6 first refers to a flow rate-pressure map, which provides reference pressures corresponding to values of the measured flow rate, to determine a reference pressure corresponding to the measured flow rate, and outputs a reference flow rate corresponding to the deviation between the reference pressure and the measured pressure to the valve control part 5 of the second mass flow controller MFC2.

That is, the reference flow rate generator 6 is configured to include a map storage part 61, reference pressure determination part 62, reference pressure limiter 63, and reference flow rate calculation part 64.

Figure 4:
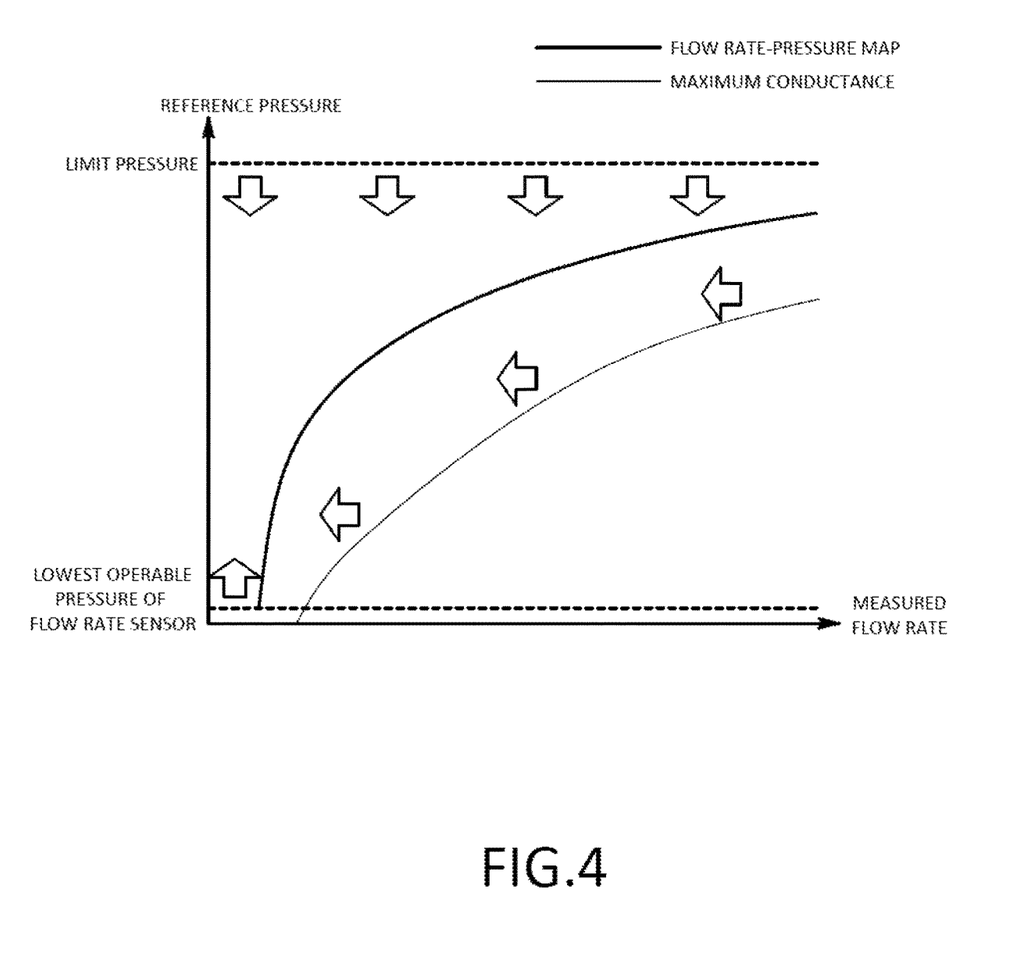
FIG. 4 is a schematic graph illustrating the relationship between a characteristic map and characteristic functions in the fluid control apparatus of the first embodiment.

The map storage part 61 is one that stores the flow rate-pressure map, for example, as illustrated in a graph of FIG. 4. The flow rate-pressure map is a one-dimensional map that when some measured flow rate value is measured by the flow rate sensor 2, provides a reference pressure value so as to fall below at least the limit pressure of the gas reservoir G as a required specification. The flow rate-pressure map in the first embodiment further links a reference pressure equal to or more than the lowest operable pressure of the flow rate sensor 2 to the value of each measured flow rate, and is also set so as to fall below the maximum conductance of the valve 2. Such a flow rate-pressure map is determined by obtaining a reference pressure corresponding to each measured flow rate through experiment. In the first embodiment, in order to prevent gas leakage, the limit pressure set upon request for safety is set to, for example, 400 Torr that is a lower value than atmospheric pressure. Also, the tolerance stipulated from the required flow rate control specification is ±2% of the reference flow rate, and the convergence time is set to, for example, 1 sec.

The flow rate-pressure map may be one in a table format consisting of sets of a measured flow rate and a reference pressure, or may be, for example, a function having a measured flow rate as an input variable and a reference pressure as an output variable. As the value of the measured flow rate increases, the reference pressure is also set to a larger value as illustrated in the graph of the flow rate-pressure map.

The reference pressure determination part 62 is inputted with the measured flow rate measured by the flow rate sensor 2 to determine a reference pressure corresponding to the measured flow rate on the basis of the above-described flow rate-pressure map. At this time, when the value of the measured flow rate is larger than a predetermined value, a reference pressure exceeding the value of the limit pressure is set by the reference pressure determination part 62.

When the reference pressure determined by the reference pressure determination part 62 is larger than the limit pressure, the reference pressure limiter 63 changes the reference pressure to the limit pressure. Also, when the reference pressure determined by the reference pressure determination part 62 is equal to or less than the limit pressure, the reference pressure limiter 62 directly outputs the reference pressure. That is, because of the presence of the reference pressure limiter 63, for example, even if the occurrence of an overshoot causes a larger measured flow rate than usual to be inputted to the reference pressure determination part 62, and the reference pressure determination part 62 determines a value exceeding the limit pressure as a corresponding reference pressure, the reference pressure outputted from the reference pressure limiter 62 has the value of the limit pressure.

The reference flow rate calculation part 64 outputs a reference flow rate so that the deviation between the reference pressure set by the reference pressure limiter 63 and the measured pressure measured by the pressure sensor P decreases. Specifically, the reference flow rate calculation part 64 performs a PID operation on the basis of the deviation between the reference pressure and the measured pressure and set PID gains, and optimizes the reference flow rate for the measured flow rate. The reference flow rate optimized as described is outputted to the valve control part 5. Note that the reference flow rate does not necessarily have the same value every control period, but have a value appropriately changed depending on the deviation between the reference pressure and the measured pressure.

Next, the configuration of the setting change part 7 will be described. The setting change part 7 is one used to adjust the flow rate-pressure map set in the reference flow rate generator 6 and the PID gains in order to, for example, when the type of fluid to be flowed is changed or when the configuration of equipment such as a pipe length is changed, optimize control characteristics.

Specifically, the setting change part 7 includes a map reception part 71 and a gain reception part 72. The map reception part 71 is one that receives a map update command for updating the flow rate-pressure map stored in the map storage part 61. The map storage part 61 updates the flow rate-pressure map on the basis of the received map update command. Note that the map update command may be one that changes only part of the stored flow rate-pressure map or one that changes the whole of the flow rate-pressure map.

The gain reception part 72 receives a gain setting command for setting the PID gains set in the reference pressure determination part 62. On the basis of the received gain setting command, the reference pressure determination part 62 changes the set PID gains. Note that the PID gains consist of a proportional gain, an integral gain, and a derivative gain, and the gain setting command is a command for setting at least one of the three gains.

Adjustment work by the setting change part 7 will be described. For example, consider the case where the type of fluid to be flowed or equipment such as a pipe length is not changed, and the convergence time required for the measured flow rate to converge at the reference flow rate is further reduced. In such a case, the control characteristics are finely adjusted, and therefore by inputting the gain setting command to the gain reception part 72 to optimize the PID gains, the adjustment is made so that the convergence time satisfies the required specification.

On the other hand, in the case where the type of fluid and/or equipment such as a pipe length are changed and a great change in the control characteristics is required to satisfy the required specification, the map update command is further inputted to the map reception part 71 to change the flow rate-pressure map itself.

As described, the flow rate-pressure map and the PID gains are set so that the time required for the measured flow rate to converge at the reference flow rate becomes equal to or less than the predetermined time while the pressure of the gas reservoir G on the upstream side of the valve 3 is varying within a range equal to or less than the limit pressure.

The fluid control apparatus 100 of the first embodiment configured as described above can successively set, on the basis of the flow rate-pressure map, the reference pressure enabling the convergence time to be shortened corresponding to the measured flow rate at the moment. Also, the reference flow rate required for achieving such a reference pressure can be calculated by the PID operation based on pressure feedback and set in the second mass flow controller MFC2.

Also, since the reference pressure limiter 63 limits the value of the reference pressure to the limit pressure or less, the flow rate control by the second mass flow controller MFC2 can be performed so that the pressure of the gas reservoir G varies in the range equal to or less than the limit pressure.

Accordingly, while sufficiently shortening the time required for the flow rate output to converge at the reference flow rate to keep it at 1 sec or less with a sufficient amount of the fluid supplied to the second mass flow controller MFC2 at the flow rate at the moment, the pressure of the gas reservoir G can be kept suppressed to pressure lower than 400 Torr that is the limit pressure.

Also, it is not that the pressure of the gas reservoir G is always kept constant at a predetermined pressure by a pressure regulator as conventional, but that the pressure of the gas reservoir G can be varied and kept at various values equal to or less than the limit pressure. In addition, since a pressure regulator is not present, even when a gas species is changed, it is possible to make it difficult for the change to affect the valve 3 of the second mass flow controller MFC2.

Further, even if a flow rate-pressure map having a region where the reference pressure exceeds the limit pressure is set in the map reception part 71 as the map update command, in the first embodiment, the action of the reference pressure limiter 63 prevents the reference pressure larger than the limit pressure from being set. For this reason, the difficulty of and the time and effort for map creation can be reduced.

Figure 5:
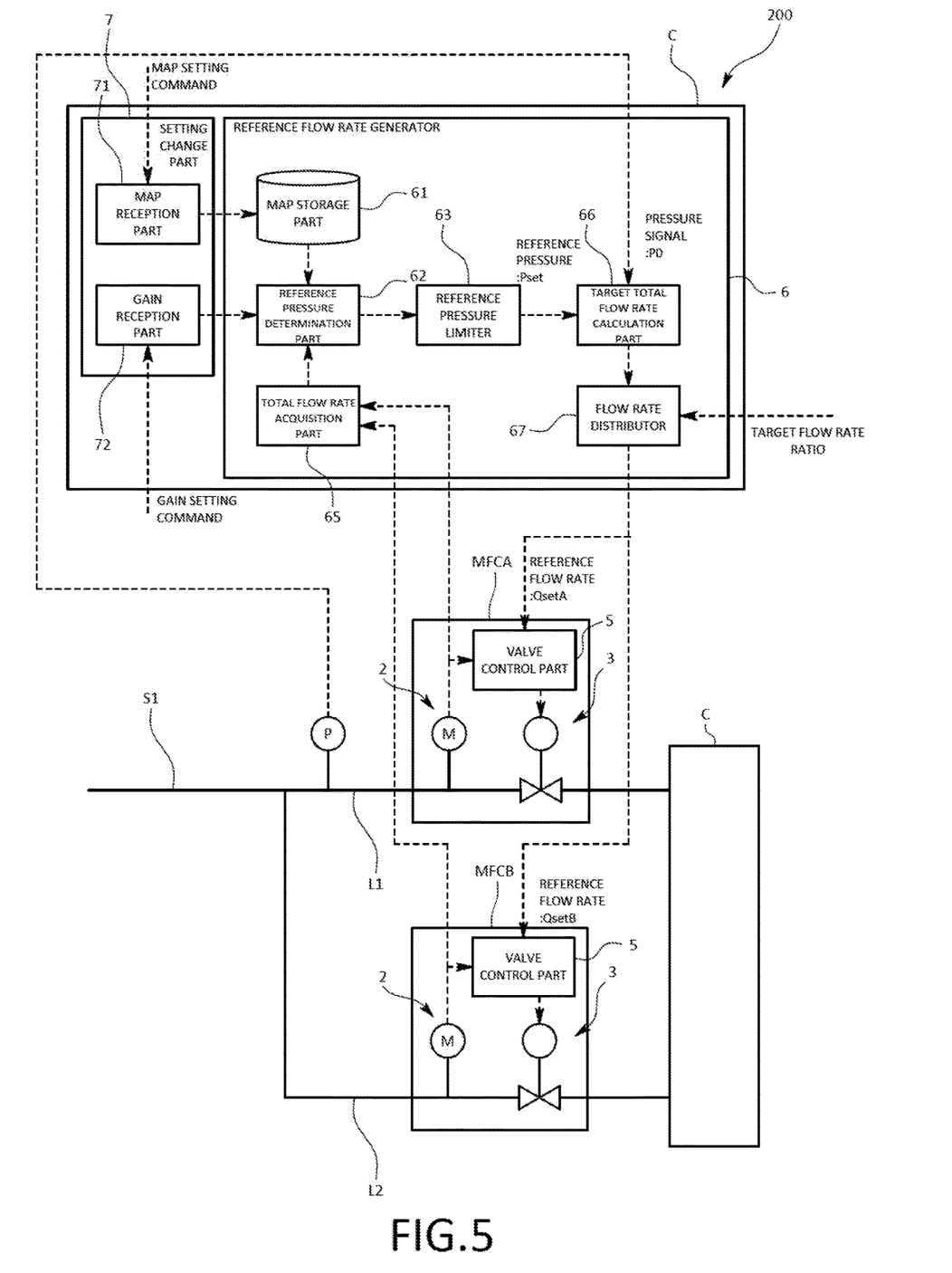
FIG. 5 is a schematic diagram illustrating a flow rate ratio control apparatus according to a second embodiment of the present invention.

Next, a flow rate ratio control apparatus 200 according to a second embodiment of the present invention will be described with reference to FIG. 5.

The flow rate ratio control apparatus 200 of the second embodiment is one that controls the flow rate ratio of fluid flowing through multiple branch flow paths L1 and L2 branching from the end of a supply flow path S1 on an upstream side, as well as controls pressure on the upstream side in the supply flow path S1 or the like to a limit pressure or less.

That is, the flow rate ratio control apparatus 200 includes: mass flow controllers MFC respectively provided in the branch flow paths L1 and L2; a controller C that sets reference flow rates in the respective mass flow controllers MFC; and a pressure sensor P provided in the supply flow path S1 or on the upstream side of the respective mass flow controllers MFC. In the following, description will be given while taking the case of two branch flow paths L1 and L2 as an example; however, the flow rate ratio control apparatus 200 may be provided with many more branch flow paths. Also, for the simplicity of description, the mass flow controller provided on the upper side of FIG. 5 is also referred to as MFCA, the branch flow path provided with MFCA as a first branch flow path L1, the mass flow controller provided on the lower side of FIG. 5 as MFCB, and the branch flow path provided with MFCB as a second branch flow path L2.

Note that the pressure sensor P, and a map storage part 61, reference pressure determination part 62, and reference pressure limiter 63 of a reference flow rate generator 6 have substantially the same configurations as those in the fluid control apparatus 100 described in the first embodiment. That is, on the basis of a flow rate-pressure map, the reference pressure determination part 62 determines a reference pressure, and when the reference pressure has a value larger than the limit pressure, the reference pressure limiter 63 changes the reference pressure to the limit pressure. Also, the reference flow rate generator 6 changes the reference flow rates to be set in valve control parts 5 of MFCA and MFCB so that pressure on the upstream side of MFCA and MFCB is suppressed to the limit pressure or less and the convergence time required for a total flow rate, which is the sum of flow rates of the fluid supplied from the respective first and second branch flow paths L1 and L2, to converge to a target value becomes equal to or less than a predetermined time. In addition, the configuration of a setting change part 7 is substantially the same as in the first embodiment.

The specific configuration of the reference flow rate generator 6 will be described. The reference flow rate generator 6 includes: the map storage part 61 that stores the flow rate-pressure map; a total flow rate acquisition part 65 that acquires measured flow rates measured by flow rate sensors 2 of the respective mass flow controllers MFCA and MFCB, and acquires the total flow rate that is the sum of the flow rates through the respective branch flow paths L1 and L2; the reference pressure determination part 62 that, on the basis of the acquired total flow rate at the moment and the flow rate-pressure map, determines the reference pressure; the reference pressure limiter 63 that limits the reference pressure to the limit pressure or less; a target total flow rate calculation part 66 that calculates a target total flow rate so that the deviation between the set reference pressure and a measured pressure measured by the pressure sensor P decreases; and a flow rate distributor 67 that, on the basis of the calculated target total flow rate and a target flow rate ratio set by a user, determines the reference flow rates to be inputted to the respective mass flow controllers.

In the first embodiment, the flow rate-pressure map provides the relationship between a flow rate through the one flow path and a reference pressure; however, in the second embodiment, the flow rate-pressure map is one providing the relationship between a total flow rate, which is the sum of flow rates measured by the respective mass flow controllers, and a reference pressure, which has the target value of the pressure on the upstream side of the respective mass flow controllers. That is, the total flow rate of the fluid supplied to a chamber, and a reference pressure allowing a conversion time to become a predetermined value or less in each mass flow controller are stored as a pair. In addition, the flow rate-pressure map is configured in an updatable manner on the basis of a map update command received by the map reception part 71.

The reference pressure determination part 62 refers to the flow rate-pressure map as described above on the basis of a total flow rate, which has a measured value, and determines a corresponding reference pressure. The determined reference pressure is inputted to the reference pressure limiter 63, and when the value thereof is larger than the limit pressure, the pressure limiter 63 changes it to the value of the limit pressure to output it, whereas when the value thereof is equal to or less than the limit pressure, the pressure limiter 63 directly outputs the value determined by the reference pressure determination part 62.

The target total flow rate calculation part 66 has a configuration corresponding to the reference flow rate calculation part 64 in the first embodiment, and calculates a target total flow rate so that the deviation between an inputted reference pressure and a measured pressure measured by the pressure sensor P decreases. That is, the target total flow rate calculation part 66 calculates the target total flow rate by performing a PID operation based on the deviation between the reference pressure and the measured pressure and set PID gains. In addition, the target total flow rate has a target value related to the sum of flow rates of the fluid flowed through the respective branch flow paths L1 and L2, and in other words, is the target flow rate of the fluid to be supplied to the chamber. Also, the PID gains are configured in an updatable manner on the basis of a gain update command received by the gain reception part 72.

The flow rate distributor 67 calculates the reference flow rates $Q_{setA}$ and $Q_{setB}$ to be inputted to the respective mass flow controllers MFCA and MFCB on the basis of the calculated target total flow rate and the target flow rate ratio between respective branch flow rates set by a user. Note that $Q_{setA}$ and $Q_{setB}$ may have respectively different values or the same value. The respective calculated reference flow rates are inputted to the valve control parts 5 of the respective mass flow controllers by the flow rate distributor 67. In addition, the target flow rate ratio is one providing the relative relationship between the flow rates of the fluid flowing through the respective branch flow paths, and one providing the ratio of the fluid supplied from respective ports of the chamber, independently of an increase/decrease in the flow rate of the fluid supplied to the chamber.

The respective individual reference flow rates are set in the respective mass flow controllers as described. As a result, the flow rate ratio of the fluid flowing through the respective branch flow paths L1 and L2 is controlled so as to become equal to the target flow rate ratio, and also the pressure on the upstream side of the respective mass flow controllers can be made lower than the limit pressure. Further, on the basis of the flow rate-pressure map, the pressure can be controlled to pressure allowing the convergence times required for the flow rates of the fluid flowing through the respective branch flow paths L1 and L2 to converge to the respective reference flow rates to become equal to a predetermined value or less Other embodiments will be described.

The fluid control apparatus is not limited to one obtained by combining the pressure sensor and the mass flow controller, but may be configured by providing a valve and a flow rate sensor as single bodies in place of the mass flow controller.

The control board and the controller may be configured to be integrated into one computer to perform various types of operations and control.

The flow rate sensor is not limited to the thermal type flow rate sensor but may be a pressure type flow rate sensor. Also, a position where the flow rate sensor is provided may be on any of the upstream and downstream sides of the valve.

The limit pressure and the convergence time may be appropriately set to various values depending on required specifications or the like. Also, an example of setting the flow rate-pressure map is not limited to one described in the embodiment. It is only required to be set added with various required specifications. The reference pressure limiter may be configured to set not only the upper limit of the reference pressure but the lower limit so that the operable pressure of the thermal type flow rate sensor is kept. For example, the reference pressure limiter may be one that when the value of the reference pressure is a value lower than the operable pressure of the flow rate sensor, changes the reference pressure to the operable pressure.

The flow rate ratio control apparatus described in the second embodiment may be one such that the respective mass flow controllers are provided with pressure sensors. Also, one mass flow controller may be one provided with functions as the reference flow rate generator and the flow rate distributor. That is, the controller described in the second embodiment is not provided as a separate body from the mass flow controllers, but may be integrated with a mass flow controller.

Besides, various combinations and modifications of the embodiments may be made without departing from the scope of the present invention.

LIST OF REFERENCE CHARACTERS

100: Fluid control apparatus
P: Pressure sensor
2: Flow rate sensor
3: Valve
5: Valve control part
6: Reference flow rate generator
61: Map storage part
62: Reference pressure determination part
63: Reference pressure limiter
65: Total flow rate acquisition part
66: Target total flow rate calculation part
67: Flow rate distributor

The invention claimed is:

1. A flow rate ratio control apparatus that controls a flow rate ratio of fluid flowing through multiple branch flow paths branching from an end of a supply flow path through which the fluid is supplied, the flow rate ratio control apparatus comprising:
    multiple fluid control apparatuses that are respectively provided in the respective branch flow paths and each of which is provided with a valve, a flow rate sensor, and a valve control part adapted to control an opening of the valve so that a deviation between an inputted reference flow rate and a measured flow rate by the flow rate sensor decreases;
    a pressure sensor provided in the supply flow path or on an upstream side of the valves of the respective fluid control apparatuses in the respective branch flow paths;
    a total flow rate acquisition part that respectively acquires the measured flow rates by the respective flow rate sensors provided in the respective branch flow paths, and acquires a total flow rate that is a sum of the respective measured flow rates;
a reference pressure determination part that is inputted with the total flow rate, and on a basis of a flow rate-pressure map, determines a reference pressure corresponding to the total flow rate,
a target total flow rate calculation part that calculates a target total flow rate so that a deviation between the reference pressure determined by the reference pressure determination part and a measured pressure measured by the pressure sensor decreases; and
a flow rate distributor that, on a basis of the target total flow rate and a predetermined target flow rate ratio of the fluid flowed through the respective branch flow paths, determines reference flow rates to be inputted to the fluid control apparatuses provided in the respective branch flow paths.

2. The flow rate ratio control apparatus according to claim 1, wherein
the target total flow rate calculation part is configured to calculate the target total flow rate by a PID operation based on the deviation between the reference pressure and the measured pressure and set PID gains, the flow rate ratio control apparatus further comprising
a gain reception part that receives a gain setting command that sets the PID gains in the target total flow rate calculation part.

3. The flow rate ratio control apparatus according to claim 1, further comprising:
a map storage part that stores the flow rate-pressure map; and
a map reception part that receives a map update command that updates the flow rate-pressure map stored in the map storage part.

4. The flow rate ratio control apparatus according to claim 1, wherein
the flow rate-pressure map and the PID gains are set so that convergence times required for deviations between the measured flow rates and corresponding ones of the reference flow rates to converge within a tolerance become equal to or less than a predetermined time.

5. The flow rate ratio control apparatus according to claim 1, further comprising
a reference pressure limiter that, when the reference pressure determined by the reference pressure determination part is larger than a limit pressure, changes the reference pressure to the limit pressure.

6. The flow rate ratio control apparatus according to claim 1, wherein
the pressure sensor is provided in at least one branch flow path or the respective fluid control apparatuses are respectively provided with the pressure sensors.

* * * * *